U̇nited States Patent Office 3,580,908
Patented May 25, 1971

3,580,908
PROCESS FOR THE CONVERSION OF α-CARBO-ARYLOXYBENZYLPENICILLINS TO α-CARBOXYBENZYLPENICILLINS
Kenneth Butler, Waterford, Conn., assignor to Pfizer Inc., New York, N.Y.
No Drawing. Filed Oct. 17, 1968, Ser. No. 768,548
Int. Cl. C07d 99/16
U.S. Cl. 260—239.1                                  6 Claims

ABSTRACT OF THE DISCLOSURE

The controlled hydrolysis of α-carbobenzyloxybenzylpenicillin and α-carboaryloxybenzylpenicillins, such as α-carbophenoxybenzylpenicillin, under alkaline conditions to α-carboxybenzylpenicillin salts.

BACKGROUND OF THE INVENTION

This invention relates to a novel process for the hydrolysis of α-carbobenzyloxybenzylpenicillin and α-carboaryloxybenzylpenicillins. More particularly, it relates to the controlled hydrolysis under aqueous alkaline conditions of the benzyl and aryl esters of α-carboxybenzylpenicillin to α-carboxybenzylpenicillin salts.

The benzyl and aryl esters of α-carboxybenzylpenicillin, that is, the benzyl and aryl esters of α-carboxybenzylpenicillin wherein the ester group is on the α-carboxy moiety, serve as intermediates for the preparation of the valuable broad spectrum penicillin, α-carboxybenzylpenicillin and its salts. The preparation of the benzyl ester and several aryl esters of α-carboxybenzylpenicillin is taught in British Patent 1,004,670 and South African Patent 67/6,472. The British patent discloses conversion of the benzyl and aryl esters to the free acid by catalytic hydrogenation. U.S. patent applications Ser. Nos. 695,895 and 695,851, filed Jan. 5, 1968, describe the preparation of a wide variety of esters of α-carboxybenzylpenicillin, including the aryl esters, and their hydrolysis to α-carboxybenzylpenicillin in saturated aqueous sodium bicarbonate solution or in essenitally neutral solutions.

Conversion of the benzyl and aryl esters of α-carboxybenzylpenicillin to the free acid form or salts thereof by the prior art methods is not satisfactory due to the tendency of α-carboxybenzylpenicillin to undergo thermal degradation benzylpenicillin and hydrolytic degradation to penicillenic and penicilloic acids in acid and alkaline solutions. Additionally, at pH values below about 8, the rate of hydrolysis of the aryl esters is very slow and, hence, the unduly long reaction periods required for completion of the desired conversion result in extensive degradation of the product. Hydrolysis reactions in which the pH is not controlled lead to poor yields of α-carboxybenzylpenicillin precisely because of hydrolytic degradation and render subsequent recovery of a high-quality crystalline product difficult.

SUMMARY OF THE INVENTION

It has now been found that under controlled conditions of pH, temperature, and, to a lesser extent, concentration of reactants, the benzyl and aryl esters of α-carboxybenzylpenicillin are readily hydrolyzed to α-carboxybenzylpenicillin in satisfactory yield. Under the novel conditions of this process, hydrolytic degradation of the ester reactant and of its desired hydrolysis product, α-carboxybenzylpenicillin, is minimized. This, of course, affords improved yields of the desired product relative to those achived by the prior art methods and, because of the absence of undesirable degradation products, simplifies subsequent steps aimed at the recovery of α-carboxybenzylpenicillin as a crystalline alkali metal salt (e.g., sodium or potassium salt).

The novel process of this invention comprises the controlled hydrolysis of α-carbobenzyloxybenzylpenicillin or of an α-carboaryloxybenzylpenicillin in aqueous alkaline solution at a pH of from about 8 to about 9.5 and at a temperature of from about 10° C. to about 50° C.

The process is conducted under controlled, relatively mild conditions and utilizes readily available equipment and reagents in contrast to the prior art hydrogenation method which requires a catalyst and more sophisticated equipment. The controlled alkaline conditions of this process, in contrast to the prior art hydrolysis methods, achieve a delicate balance of pH and temperature which minimizes undesirable degradative reactions.

The term "aryl," as used herein, includes phenyl and substituted phenyl groups wherein the substituent is selected from the group consisting of at least one of chloro, bromo, fluoro, lower alkyl, lower alkoxy, lower alkanoyl, carbo (lower)alkoxy, nitro, and di(lower)alkyl amino;

furyl
quinolyl
methyl substituted quinolyl
phenazinyl
9,10-anthraquinonyl
penanthrenequinonyl anthracenyl
phenanthryl
(1,3-benzodioxolyl)
3-(2-methyl-4-pyronyl)
3-(4-pyronyl)
(N-methyl)pyridyl

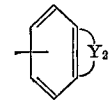

wherein $Y_2$ is selcted from the group consisting of:
—CH=CH—O—
—CH=CH—S—
—CH$_2$—CH$_2$—S—
—CH=N—CH=CH—
—CH=CH—CH=CH—
—C(O)—CH=CH—(C)O—, and
—C(O)—(CO)—CH=CH—

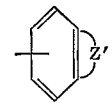

wherein Z' is lower alkylene and is selected from the group consisting of —(CH$_2$)$_3$— and (CH$_2$)$_4$—, and substituted derivatives thereof wherein the substituent is selected from the group consisting of methyl, chloro, and bromo.

DETAILED DESCRIPTION OF THE INVENTION

The aqueous alkaline hydrolysis process of this invention is controlled at a pH level of from about 8 to about 9.5 by the use of a buffer system. While any system which exerts buffering capacity within this pH range can be used to achieve hydrolysis, it has been found that certain buffer systems provide a "cleaner" reaction, that is, a reaction in which by-product formation is minimized, than do others.

At pH values below about 8, the rate of hydrolysis is very slow whereas at values above about 9.5, it is very rapid and difficult to control. Precise pH control, therefore, is essential to achieve optimum hydrolysis and conversion to the desired product.

The use of an alkali metal bicarbonate or alkali metal carbonate alone as buffer or in combination with an alkali metal hydroxide results in poor control of the reaction and unsatisfactory yield of the desired product due to a great extent to further hydrolysis to penicilloic acid.

The buffer systems favored for pH control within this range are glycine/sodium hydroxide and boric acid/sodium hydroxide. The preferred buffer system is the boric acid/sodium hydroxide system which reduces degradation and formation of colored by-products. Additionally, the buffer salts are difficultly or only slightly soluble in organic solvents used for the subsequent recovery of α-carboxybenzylpenicillin from the hydrolysis mixture and thus afford a better quality product.

In certain of these buffer systems, it is advantageous to maintain the ionic strength at a given level for optimum buffering capacity. Thus, in the boric acid/sodium hydroxide and the glycine/sodium hydroxide (Sörensen-Walbum) systems, sodium or potassium chloride are normally used as a component of the system.

It should be noted that buffer systems which comprise a salt of an organic acid, e.g., phthalic acid/sodium hydroxide or citric acid/sodium hydroxide, can also be used in this process. However, such buffer systems are not favored since the organic acid component of the buffer system is generally carried along in subsequent recovery steps, particularly in a solvent extraction process, and is difficult to separate from the desired product.

The pH can, of course, be maintained within the range of 8 to 9.5 by the continuous addition of a base, e.g., sodium or potassium hydroxide, bicarbonate or carbonate. However, regulation of the pH in this manner does not permit adequate control of the hydrolysis and tends to result in excessive degradation of the product.

The above-mentioned buffer systems refer only to the sodium salts of the various components. However, as those skilled in the art will recognize, the corresponding potassium salts can be used with substantially the same results. In general, the alkali metal salts of the various buffer components can be used in this novel process. However, from a practical standpoint, the "alkali metal" salts, as used herein, refers to only the sodium and potassium salts of the buffer components. The sodium salts are preferred from an economic standpoint over the potassium salt.

The hydrolysis is desirably conducted at a temperature of from about 10° C. to about 50° C. Below a temperature of about 10° C., the rate of hydrolysis decreases, requiring increased reaction periods over those required at higher temperatures. Despite the lower temperature, the prolonged contact of the ester reactant and its hydrolysis product with alkaline conditions tends to increase the product formation. At a temperature of about 50° C., hydrolysis is extremely rapid. However, the increased reaction rate is offset by an increase in degradation of the reactant and product. The favored temperature range is from about 15° C. to about 40° C.; the preferred range from about 20° C. to about 30° C.

The reaction period depends upon the temperature and ester reactant used. In general, reaction periods of from about one to about 24 hours are sufficient to achieve substantially complete hydrolysis of the ester reactants described herein. The longer reaction periods apply to certain esters, such as the 2-isopropylphenyl ester and others, having a substituent in the ortho-position of the aryl moiety. In actual practice, it is expedient to select an ester and temperature which permit a reaction period of not over about four hours under the controlled conditions of this process. The phenyl ester of α-carboxybenzylpenicillin is especially useful in the present process.

From the standpoint of the present process, the concentrations of the reactants is not critical. It is advantageous, however, in order to facilitate subsequent steps for the recovery of α-carboxybenzylpenicillin, to employ an initial concentration of the chosen ester reactant of from about 0.1 to about 10% by weight. This particular concentration range permits easy control of pH throughout the hydrolysis. A concentration range of from about 3% to about 5% of ester reactant is especially useful.

The concentration of the buffer system is not critical. Buffer concentrations of from about 0.05 M to about 0.5 M are especially useful in permitting close pH control.

The amount of buffer used depends upon the amount of ester reactant, of course. In general, sufficient buffer is added to effectively maintain the pH within the range of about 8 to about 9.5.

The ester reactants can be used in the form of their sodium, potassium, calcium, barium, magnesium, ammonium, procaine, triethylamine, N-ethylpiperidine, N,N'-dibenzylethylenediamine, dibenzylamine, benzylhydrylamine, and other amine salts. It is frequently advantageous to use an amine salt of the ester reactant because such a salt can more easily be obtained in pure form than can the sodium or potassium salts. In the case of α-carbophenoxybenzylpenicillin, the N-ethylpiperidine salt is a favored form for the hydrolysis reaction.

It has been observed in runs conducted at or near the upper limit of the pH range that, if the pH of the reaction is allowed to decrease toward the end of the hydrolysis reaction, degradation of the product is minimized. A drop in pH to about 8.4 during the hydrolysis is, therefore, desirable in such instances. The decrease in pH is achieved by careful choice of the amount of buffer system used and, to some extent, by the concentration of the ester reactant. The pH can also, of course, be decreased by the addition of an acid, but this is not desirable since localized pH changes may cause undue degradation of the product.

The reaction is normally conducted in water as solvent but, if the solubility of the chosen ester reactant does not permit formation of a homogeneous reaction mixture, a reaction-inert, water-miscible organic solvent can be added to the aqueous phase. By reaction-inert solvent is meant one which does not react with the reactants or products in an undesirable manner. Suitable solvents are acetone, dioxone, tetrahydrofuran, and 1,2-dimethoxyethane. Water-miscible lower alkanols containing from one to four carbon atoms can also be used but, because of transesterification reactions, are not desirable.

The following examples serve to illustrate the process of this invention and are not to be construed as imposing any limitations on the scope thereof.

Example I.—Hydrolysis of α-carbophenoxybenzylpenicillin N-ethylpiperidine salt

Boric acid (61.8 g.) and potassium chloride (74.56 g.) are dissolved in water and sufficient water added to the solution to bring the volume to 2 liters. A sufficient amount of 0.5 N sodium hydroxide is added to adjust the solution to pH 9.0. α-carbophenoxybenzylpenicillin N-ethylpiperidine salt is dissolved in this buffer solution in sufficient amount to provide a 3 percent solution of the ester and the mixture stirred at room temperature (25° C.) for 2.5 hours. The reaction mixture becomes more acidic as hydrolysis occurs until, at the cessation of reaction, the mixture is pH 8.45. The mixture becomes turbid during the last 15 minutes of the reaction due to separation of by-product phenol from the weakly basic solution.

The reaction is cooled to 0°–10° C. and methyl isobutyl ketone (400 ml.) added, followed by sufficient 2 N hydrochloric acid (ca., 250 ml.) to acidify the mixture to pH 2.2. The mixture is allowed to separate, the methyl isobutyl ketone extract collected, and the aqueous liquor extracted with two more volumes (each 300 ml.) of methyl isobutyl ketone. Water (200 ml.) is added to the combined extracts, the mixture cooled to 0°–10° C., and a solution of sodium bicarbonate (8 g. in 20 ml. $H_2O$) added dropwise over a 5-minute period. To the mixture, now pH 5.8, a small volume of saturated sodium bicarbonate solution is cautiously added to bring the pH to 7.0. The aqueous extract of α-carboxybenzylpenicillin sodium salt is collected and the methyl isobutyl ketone liquor extracted with two separate volumes (150 ml.) of water. n-Butanol (100 ml.) is added to the combined aqueous extracts and the mixture stirred and chilled to 0°–10° C. Sufficient 2 N hydrochloric acid is added to bring the mixture to pH 3.0, the mixture allowed to separate, and the butanol layer collected. The acidic aqueous liquor is extracted twice with 75 ml. volumes of butanol, the combined butanol solutions (250 ml.) dried over anhydrous sodium sulfate (300 g.) for one hour, then filtered into a 1000 ml. 3-neck flask equipped with a mechanical stirrer and an addition funnel. An acetone solution of sodium 2-ethyl hexanoate (169 ml. containing 207.5 mg. of salt per ml.) is added dropwise over a 20 to 30-minute period. When approximtaely one-half of the solution has been added, the mixture is seeded with crystalline disodium salt. The mixture is stirred for 30 minutes following addition of the sodium ethyl hexanoate, then acetone (225 ml.) added, and the mixture stirred for an additional 15 minutes. The crystal- Progress of the hydrolysis is monitored by thin layer chromatography (Eastman Chromatogram Sheets, Silica Gel 6060/acetone 400; 0.2 M sodium acetate, 50). The chromatogram sheets are allowed to dry at room temperature, then exposed to ammonia vapor, sprayed with $K_3Fe(CN)_6$/$FeCl_3$ reagent, and the sheets developed in $I_2$ vapor. Alpha-carboxybenzylpenicillin has $R_f$ 0.18.

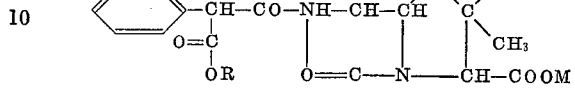

| R | M | R | M |
|---|---|---|---|
| o-Tolyl | Na | o-Acetylphenyl | Na |
| m-Tolyl | Na | p-Butyrylphenyl | Na |
| p-Tolyl | Na | p-Nitrophenyl | K |
| p-t-Butylphenyl | Na | m-Carbomethoxyphenyl | Na |
| o-Methoxyphenyl | Na | o-Dimethylaminophenyl | K |
| p-Methoxyphenyl | Na | m-di-n-Propylaminophenyl | K |
| p-n-Butoxypheny | Na | p-Dimethylaminophenyl | K |
| o-Chlorophenyl | Na | 2,4-dimethylphenyl | K |
| m-Bromophenyl | Na | 3-methyl-4-t-butylphenyl | Na |
| p-Fluorophenyl | Na | 3,4,5-trimethylphenyl | Na |
| m-Formylphenyl | Na | 2,3,4,6-tetramethylphenyl | Na |
| Pentamethylphenyl | Na | 4-indanyl | Na |
| 2,6-dichlorophenyl | Na | 5-indanyl | Na |
| 2,4,6-tribromophenyl | Na | 5-methyl-4-indanyl | Na |
| Pentachlorophenyl | Na | 1-methyl-4-indanyl | Na |
| 2,4-dinitrophenyl | Na | 1,1,2,3-tetramethyl-4-indanyl | K |
| Pentanitrophenyl | Na | 5-chloro-4-indanyl | Na |
| 2,4-difluorophenyl | Na | 6-chloro-5-indanyl | Na |
| 2-methoxy-4-methylphenyl | Na | 4-(1-indanyl) phenyl | K |
| 2-chloro-6-methoxyphenyl | Na | 4-(α,α-dimethylbenzyl) phenyl | K |
| 2-carbomethoxy-5-fluorophenyl | Na | 1-naphthyl | Na |
| 4-acetyl-2-fluorophenyl | K | 2-naphthyl | Na |
| 4-chloro-2,3-dimethylphenyl | K | 1-(5,6,7,8-tetrahydronaphthyl) | Na |
| 4-dimethylamino-2-methy phenyl | K | 2-(5,6,7,8-tetrahydronaphthyl) | Na |
| 2,3-dimethoxyphenyl | Na | 3-(2-methyl-4-pyronyl) | Na |
| 3,4,5-trimethoxyphenyl | Na | 3-quinolyl | K |
| o-Propionylphenyl | K | 4-quinolyl | K |
| 2-anthraquinonyl | Na | 6-quinolyl | K |
| 1-fluroenyl | Na | 8-quinolyl | K |
| 6.(1,2-naphthoquinonyl) | Na | 5-(1,4-naphthoquinonly | Na |
| 1-anthraquinonyl | Na | 6-(1,4-naphthoquinonyl) | Na |
| 8-isoquinonyl | K | 4-(coumarinyl) | K |
| 4-(1,3-benzodioxolyl) | K | 6-(coumarinyl) | K |
| 2-furyl | Na | 4-thianaphthenyl | Na |
| 3-furyl | K | 1-phenazinyl | K |
| 3-(N-methyl) pyridyl | K | 2-phenazinyl | K | line disodium salt is collected by filtration on a sintered glass funnel under an atmosphere of dry nitrogen, and the filter cake washed with acetone (500 ml.). The cake is slurried in fresh acetone (1000 ml.), the slurry stirred at room temperature for 30 minutes, filtered as described above, and allowed to dry on the filter in a stream of dry nitrogen for 16 hours. The product is a white, free-flowing crystalline powder, slightly hygroscopic and readily soluble in water. Yield=25.6 g. (60%), M.P. 198°–201° C. dec.

Example II

The α-carboaryloxybenzylpenicillins listed below are hydrolyzed by the procedure of Example I. The reaction is allowed to continue until hydrolysis is substantially complete. The α-carboxybenzylpenicillin is isolated as the crystalline disodium salt.

Example III

The procedure of Example I is repeated but using M/20 borate buffer (pH 9.0) and the following aryl esters of α-carboxybenzylpenicillin as their N-ethylpiperidine salts at 0.1–0.5% concentration. The percent hydrolysis is determined at various time intervals by thin layer chromatography in the system described in Example II.

| | Percent hydrolysis | | | | | | | | |
|---|---|---|---|---|---|---|---|---|---|
| Hours | 0.5 | 1.0 | 2.0 | 2.5 | 2.75 | 4.0 | 4.5 | 6.0 | 24.0 |
| Easter: | | | | | | | | | |
| 2-isopropylphenyl | 10 | | 70–80 | 100 | | | [1] 100 | | |
| Benzyl | | 5–10 | | | 50 | | 60–70 | 70–80 | [1] 100 |
| 2-methyl-4-chlorophenyl | 45–50 | 80–90 | 100 | | | [1] 100 | | | |
| Phenyl | 40 | 80 | 95 | | 100 | [1] 100 | | | |
| Do.[2] | 50 | 95 | 99± | [1] 100 | | | | | |

[1] Coproduction of penicilloic acid observed.
[2] 3% concentration of easter in 0.5 M buffer.

A similar study of the potassium salt of α-[carbo-(2-isopropylphenoxy)]benzylpenicillin shows it to be hydrolyzed at the same rate as the N-ethylpiperidine salt.

Example IV

Solutions (0.1%) of α-[carbo-(4-chloro-2-methylphenoxy)]benzylpenicillin N-ethylpiperidine salt are hydrolyzed in glycine/sodium chloride/sodium hydroxide (Sörensen-Walbum) buffers at various pH levels and 25° C.

and the percent hydrolysis determined by thin layer chromatography in the system described in Example II.

| Hours | Percent hydrolysis | | | | |
|---|---|---|---|---|---|
| | 0 | 0.5 | 1.0 | 2.0 | 4.0 |
| pH 8.2 | 0 | 5 | 45–50 | 70 | 85 |
| pH 8.5 | 0 | 5–10 | 50–60 | 80 | 95 |
| pH 9.0 | 0–5 | 45–50 | 80–90 | 100 | [1] 100 |
| pH 9.5 | 0–5 | <70 | [1] <90 | [1] 100 | [1] 100 |

[1] Coproduction of penicilloic acid, indicating hydrolytic degradation of product.

Repetition of the above procedure but using citric acid/sodium hydroxide buffer system produces similar results.

Example V

The procedure of Example I is repeated but using a 5% addition of α-carbophenoxybenzylpencillin N-ethylpiperidine salt rather than a 3% solution. Similar results are obtained.

Example VI

Alpha-[carbo-(2-isopropylphenoxy)]benzylpenicillin is hydrolyzed according to the procedure of Example III but using boric acid/potassium hydroxide buffer in place of boric acid/sodium hydroxide. Determination of the percent hydrolysis shows it to be substantially the same as that observed in Example III.

What is claimed is:

1. A process for the hydrolysis of an ester selected from the group consisting of α-carbobenzyloxybenzylpenicillin, α-carboaryloxybenzylpenicillins and salts thereof which comprises subjecting an aqueous solution of said ester to a pH buffered at from about 8 to about 9.5 at a temperature of from about 10° C. to about 50° C. and recovering α-carboxybenzylpenicillin therefrom, the pH being buffered with a system selected from the group consisting of boric acid/alkali metal hydroxide, glycine/alkali metal hydroxide and citric acid/alkali metal hydroxide wherein the alkali metal hydroxide is sodium hydroxide or potassium hydroxide.

2. The process of claim 1 wherein the alkali metal hydroxide is sodium hydroxide.

3. The process of claim 2 wherein the α-carboaryloxybenzylpenicillin is α-carbophenoxybenzylpenicillin.

4. The process of claim 3 wherein the buffer system is boric acid/sodium hydroxide.

5. The process of claim 4 wherein the pH is buffered at from about 8.5 to about 9.5.

6. The process of claim 4 wherein the temperature is from about 20° C. to about 30° C.

References Cited

UNITED STATES PATENTS 3,282,926  11/1966  Brain et al. _____ 260—239.1

OTHER REFERENCES

Freser et al., Organic Chemistry, pages 179–180 (1950).

NICHOLAS S. RIZZO, Primary Examiner

UNITED STATES PATENT OFFICE
CERTIFICATE OF CORRECTION

Patent No. 3,580,908        Dated May 25, 1971

Inventor(s) Kenneth Butler

It is certified that error appears in the above-identified patent and that said Letters Patent are hereby corrected as shown below:

Column 1, line 37, "695,895" should read -- 695,894 --

Column 6, line 10, the formula now reading

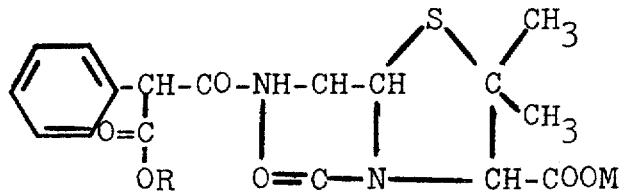

should read

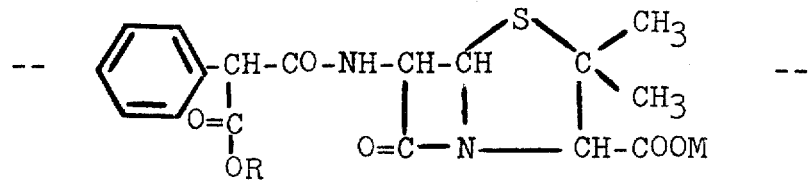

Signed and sealed this 14th day of December 1971.

(SEAL)
Attest:

EDWARD M. FLETCHER, JR.          ROBERT GOTTSCHALK
Attesting Officer                Acting Commissioner of Patents